(12) United States Patent
Sato et al.

(10) Patent No.: US 11,747,577 B2
(45) Date of Patent: Sep. 5, 2023

(54) WAVEGUIDE CONNECTION STRUCTURE, WAVEGUIDE CHIP, CONNECTOR, AND METHOD OF MANUFACTURING WAVEGUIDE CONNECTION COMPONENT, AND WAVEGUIDE CONNECTING METHOD

(71) Applicant: Nippon Telegraph and Telephone Corporation, Tokyo (JP)

(72) Inventors: Norio Sato, Tokyo (JP); Kota Shikama, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 6 days.

(21) Appl. No.: 17/607,326

(22) PCT Filed: May 22, 2019

(86) PCT No.: PCT/JP2019/020254
§ 371 (c)(1),
(2) Date: Oct. 28, 2021

(87) PCT Pub. No.: WO2020/235041
PCT Pub. Date: Nov. 26, 2020

(65) Prior Publication Data
US 2022/0206233 A1  Jun. 30, 2022

(51) Int. Cl.
*H04B 10/00* (2013.01)
*G02B 6/42* (2006.01)

(52) U.S. Cl.
CPC ......... *G02B 6/4219* (2013.01); *G02B 6/4257* (2013.01)

(58) Field of Classification Search
CPC .. G02B 6/4219; G02B 6/4257; G02B 6/3897; G02B 6/4214; G02B 6/4232; G02B 6/428; G02B 6/305
See application file for complete search history.

(56) References Cited

U.S. PATENT DOCUMENTS

| | | | | |
|---|---|---|---|---|
| 4,082,421 A | * | 4/1978 | Auracher | G02B 6/32 385/59 |
| 4,341,439 A | * | 7/1982 | Hodge | G02B 6/3885 385/59 |
| 4,737,118 A | * | 4/1988 | Lockard | H01R 24/84 439/594 |
| 4,818,058 A | * | 4/1989 | Bonanni | G02B 6/3882 385/59 |

(Continued)

FOREIGN PATENT DOCUMENTS

| | | |
|---|---|---|
| JP | H0829638 A | 2/1996 |
| JP | 2002090578 A | 3/2002 |

OTHER PUBLICATIONS

Atsushi Aratake, "Field reliability of silica-based PLC splitter for FTTH," 2015 Optical Fiber Communications Conference and Exhibition (OFC), Mar. 22, 2015, 3 pages.

(Continued)

*Primary Examiner* — Agustin Bello
(74) *Attorney, Agent, or Firm* — Slater Matsil, LLP

(57) ABSTRACT

A waveguide connection structure consists of a waveguide chip having a waveguide, and a connector having a groove dug in a thickness direction, the waveguide chip and the connector each having a concave-convex portion that fit into each other in a state of being adjacent to each other on the same plane.

12 Claims, 12 Drawing Sheets

(56) References Cited

U.S. PATENT DOCUMENTS

| | | | | |
|---|---|---|---|---|
| 4,830,456 | A * | 5/1989 | Kakii | G02B 6/389 385/59 |
| 5,016,972 | A * | 5/1991 | Schlaak | G02B 6/3839 385/95 |
| 5,175,781 | A * | 12/1992 | Hockaday | G02B 6/30 385/50 |
| 5,183,409 | A * | 2/1993 | Clever | H01R 13/28 439/291 |
| 5,188,539 | A * | 2/1993 | Langdon | H01R 13/639 439/341 |
| 5,214,730 | A * | 5/1993 | Nagasawa | G02B 6/389 385/71 |
| 5,315,678 | A * | 5/1994 | Maekawa | G02B 6/3839 385/59 |
| 5,420,954 | A * | 5/1995 | Swirhun | G02B 6/4231 385/24 |
| 5,430,819 | A * | 7/1995 | Sizer, II | G02B 6/3885 385/55 |
| 5,550,942 | A * | 8/1996 | Sheem | G02B 6/30 385/53 |
| 5,596,662 | A * | 1/1997 | Boscher | G02B 6/30 385/83 |
| 5,633,968 | A * | 5/1997 | Sheem | G02B 6/3833 385/53 |
| 5,703,973 | A * | 12/1997 | Mettler | G02B 6/30 385/52 |
| 5,742,720 | A * | 4/1998 | Kobayashi | G02B 6/4249 385/83 |
| 5,778,123 | A * | 7/1998 | Hagan | G02B 6/4231 385/76 |
| 5,784,509 | A * | 7/1998 | Yamane | G02B 6/3636 385/35 |
| 5,845,028 | A * | 12/1998 | Smith | G02B 6/4257 385/59 |
| 6,118,917 | A * | 9/2000 | Lee | G02B 6/30 385/52 |
| 6,160,936 | A * | 12/2000 | You | G02B 6/30 385/52 |
| 6,164,836 | A * | 12/2000 | Yamada | G02B 6/4232 385/132 |
| 6,282,352 | B1 * | 8/2001 | Kato | G02B 6/4292 385/94 |
| 6,293,711 | B1 * | 9/2001 | Sasaki | G02B 6/4257 385/91 |
| 6,371,658 | B2 * | 4/2002 | Chong | G02B 6/3885 385/59 |
| 6,595,700 | B2 * | 7/2003 | Steinberg | G02B 6/4228 385/88 |
| 6,618,514 | B1 * | 9/2003 | Cole | G02B 6/30 385/52 |
| 6,799,897 | B2 * | 10/2004 | Sherrer | G02B 6/3839 385/89 |
| 6,832,016 | B2 * | 12/2004 | Steinberg | G02B 6/3508 385/20 |
| 6,866,426 | B1 * | 3/2005 | Steinberg | G02B 6/423 385/83 |
| 6,955,480 | B2 * | 10/2005 | Gallup | G02B 6/4226 385/52 |
| 7,253,388 | B2 * | 8/2007 | Kuhmann | B81C 3/002 257/432 |
| 7,333,147 | B2 * | 2/2008 | Adachi | H01L 27/14625 257/E31.127 |
| 7,603,021 | B2 * | 10/2009 | Watanabe | G02B 6/3636 385/137 |
| 7,620,278 | B2 * | 11/2009 | Sato | G02B 6/30 385/52 |
| 7,876,988 | B2 * | 1/2011 | Yasuda | G02B 6/30 385/39 |
| 9,103,999 | B2 * | 8/2015 | Schunk | G02B 6/4277 |
| 9,274,287 | B2 * | 3/2016 | Takano | G02B 6/3883 |
| 9,494,741 | B2 * | 11/2016 | Gardes | G02B 6/423 |
| 10,162,123 | B2 * | 12/2018 | Smith | G02B 6/3831 |
| 10,162,126 | B2 * | 12/2018 | Elenbaas | G02B 6/3874 |
| 10,215,926 | B2 * | 2/2019 | Ott | G02B 6/38 |
| 10,942,316 | B1 * | 3/2021 | Feng | G02B 6/3839 |
| 11,409,059 | B1 * | 8/2022 | Vermeulen | G02B 6/4251 |
| 2002/0034362 | A1 * | 3/2002 | Yamazaki | G02B 6/30 385/80 |
| 2015/0198773 | A1 * | 7/2015 | Nakama | G02B 6/3846 385/79 |
| 2016/0187591 | A1 * | 6/2016 | Fortusini | G02B 6/3882 385/77 |
| 2017/0160490 | A1 * | 6/2017 | Zhang | G02B 6/3845 |
| 2017/0307828 | A1 * | 10/2017 | Elenbaas | G02B 6/3817 |
| 2017/0363816 | A1 * | 12/2017 | Elenbaas | G02B 6/3839 |
| 2018/0156986 | A1 * | 6/2018 | Lu | G02B 6/3882 |
| 2019/0384019 | A1 * | 12/2019 | Fiebig | G02B 6/42 |
| 2019/0384024 | A1 * | 12/2019 | Neukirch | G02B 6/4292 |
| 2022/0206233 | A1 * | 6/2022 | Sato | G02B 6/4219 |

OTHER PUBLICATIONS

Baba Toshihiko, "Silicon Micro-Waveguide and its device application," Silicon Micron/Nano-Size Optical Waveguides and Their Device Applications, Optics, vol. 37, No. 1, 2008, pp. 7-13.

* cited by examiner

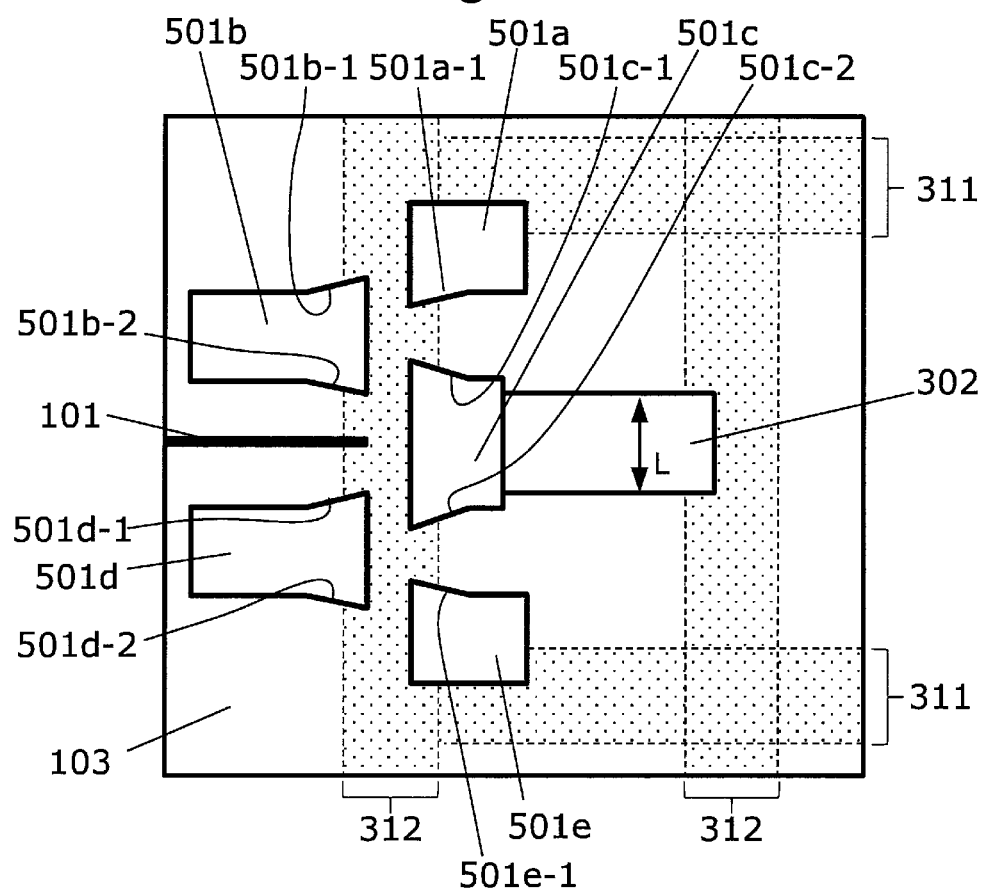

WAVEGUIDE CONNECTION STRUCTURE, WAVEGUIDE CHIP, CONNECTOR, AND METHOD OF MANUFACTURING WAVEGUIDE CONNECTION COMPONENT, AND WAVEGUIDE CONNECTING METHOD

CROSS-REFERENCE TO RELATED APPLICATIONS

This application is a national phase entry of PCT Application No. PCT/JP2019/020254, filed on May 22, 2019, which applications are hereby incorporated herein by reference.

TECHNICAL FIELD

The present invention relates to a production method of a waveguide connection structure, a waveguide chip, a connector, and a waveguide connection component, and a waveguide connection method, and relates to a production method of a connection structure of a waveguide chip having fibers and a waveguide for transmitting light to transmit and process optical signals such as, for example, optical communication and light sensing, a waveguide chip, a connector, and a waveguide connection component, and a waveguide connection method.

BACKGROUND

In order to connect a waveguide chip having a waveguide substrate to an optical fiber, a connection structure as shown in FIG. 8 is used. Here, a chip 1001 includes a waveguide 1002 made of glass on its upper surface, while a fiber 1003 includes a core 1004.

In order to optically connect the waveguide 1002 and the core 1004, the fiber 1003 is first sandwiched between a V-groove chip 1005 having a V-groove and a flat plate 1006, which are fixed with an adhesive, the end face of the fiber 1003, and the end faces of the V-groove chip 1005 and the flat plate 1006 are polished to become flush, to produce a fiber block 1007.

Further, since the fiber block 1007 is thick, a block 1008 is fixed on the chip 1001 with adhesive, and, as in the production of the fiber block 1007, the end faces of the chip 1001, the waveguide 1002, and the block 1008 are polished to become flush.

Next, the fiber block 1007 is aligned (centered) relative to the waveguide 1002 so that light may pass between the waveguide 1002 and the core 1004, and the fiber block 1007, the chip 1001, and the block 1008 are fixed by adhesive where optical insertion loss is minimized.

Although not shown here, the portion of the fiber 1003 protruding outside of the V-groove chip 1005 is coated with resin or the like for mechanical and chemical protection. (Non-Patent Literature 1)

In recent years, waveguide chips that use silicon instead of glass as the waveguide material (silicon photonics) are being used. Since silicon is a material with a higher refractive index than glass, silicon optical waveguides are of a structure in which a cross-section perpendicular to the waveguide direction is a rectangular cross-section of 0.5 µm or less, which is smaller than the core diameter of the fiber (a few µm). In order to optically connect a silicon waveguide and a core of an optical fiber with such a difference in size, a structure for mutual connection is used in which a spot size converter is formed at the chip end face, which is the end of the waveguide, to expand the beam shape to about 4 µm, and a thin fiber with a core diameter of about 4 µm is used (Non-Patent Literature 2).

CITATION LIST

Non-Patent Literature

Non-Patent Literature 1: A. Aratake, "Field reliability of silica-based PLC splitter for FTTH", Proc. OFC2015, Th4H.6, 2015.
Non-Patent Literature 2: Toshihiko Baba, "Silicon microwaveguide and its application", Kogaku, Vol. 37, No. 1, pp. 7-13, 2008.

SUMMARY

Technical Problem

When the optical waveguide and the fiber core are this small, an alignment precision of 0.1 µm or less is necessary. However, with the conventional method described above, that is to say with active alignment in which the fiber block is aligned (centered) relative to the waveguide so that light may pass, it is not easy to perform highly precise alignment and connect. Further, due to changes in the adhesive over time or the like, it is difficult to stably maintain a highly precise alignment and connection even after connecting.

It is thus an object of the present invention to provide a waveguide connection structure that makes it easy to realize highly precise alignment.

Means for Solving the Problem

In order to achieve the above object, a waveguide connection structure (1) according to the present invention consists of a waveguide chip (100) having a waveguide (101) and a connector (110) having a groove (111) dug in a thickness direction, the waveguide chip (100) and the connector (110) each having a concave-convex portion (102, 112) that fit into each other in a state of being adjacent to each other on the same plane.

In a waveguide connection structure according to an embodiment of the present invention, the waveguide chip and the connector respectively include a first substrate (104) and a second substrate (114) formed from silicon, the first substrate and the second substrate may be formed at a same thickness.

In addition, in a waveguide connection structure according to another embodiment of the present invention, an end of a convex portion of the concave-convex portion may be formed in a tapered shape.

In addition, a waveguide connection structure according to another embodiment of the present invention may further include a locking mechanism consisting of a locking claw formed on a convex portion of the concave-convex portion and a locking groove formed in a concave portion.

In addition, a waveguide chip according to the present invention includes a substrate (104); and a waveguide (101) formed on a surface of the substrate, wherein the substrate (104) has a concave-convex portion (102) arranged along a direction orthogonal to the waveguide as seen in a plan view, the concave-convex portion (102) being configured to fit into a concave-convex portion (112) formed on another component (110) in a state of the substrate (104) being adjacent to the other component (110) on a same plane.

In addition, a connector according to the present invention includes a substrate (114) having a groove (111) dug in a thickness direction, wherein the substrate has a concave-convex portion (112) arranged in a direction orthogonal to the groove as seen in a plan view, the concave-convex portion (112) being configured to fit into a concave-convex portion (102) formed on another component (100) in a state of the substrate (114) being adjacent to the other component (100) on a same plane.

In addition, a production method of a waveguide connection component according to the present invention includes a step of forming a waveguide on a surface of a substrate; a step of forming a groove that is dug in a thickness direction of the substrate and extending in a direction away from an end face of the waveguide, and a plurality of through holes arranged in a staggered manner along a direction orthogonal to the waveguide as seen in a plan view, each through hole penetrating the substrate; and a step of cutting the substrate along a direction orthogonal to the waveguide as seen in a plan view and separating the substrate into a first piece and a second piece including concave-convex portions that fit into each other, wherein the first piece is a waveguide chip having a first substrate which is a part of the substrate and the waveguide, and the second piece is a connector having a second substrate which is another part of the substrate and the groove formed in the second substrate.

In addition, an optical waveguide connection method according to the present invention includes a step of preparing a waveguide chip and a connector each having a concave-convex portion that fit into each other in a state of being adjacent to each other on a same plane, the waveguide chip having a first substrate and a waveguide formed on a surface of the first substrate, the connector having a second substrate, the second substrate having a groove dug in a thickness direction of the second substrate; a step of fixing an end of an optical fiber in the groove of the connector; a step of electrically connecting the waveguide chip to a package; a step of electrically connecting the package to a printed circuit board; and a step of fitting the concave-convex portion of the connector into the concave-convex portion of the waveguide chip inside the package to optically connect the waveguide and the optical fiber.

Effects of Embodiments of the Invention

According to embodiments of the present invention, so-called active alignment is not necessary, so highly precise alignment can easily be realized even with a small waveguide connection structure. Further, since the waveguide chip and the connector having the fiber are formed from the same substrate using a series of microfabrication steps, a small waveguide connection structure enabling highly precise alignment passively can be obtained.

BRIEF DESCRIPTION OF THE DRAWINGS

FIG. 5A is a top view showing a configuration of a wafer used in production of a waveguide connection component according to a second embodiment of the present invention.

DETAILED DESCRIPTION OF ILLUSTRATIVE EMBODIMENTS

Embodiments of the present invention are described below with reference to the drawings.

First Embodiment

Figure 1A:
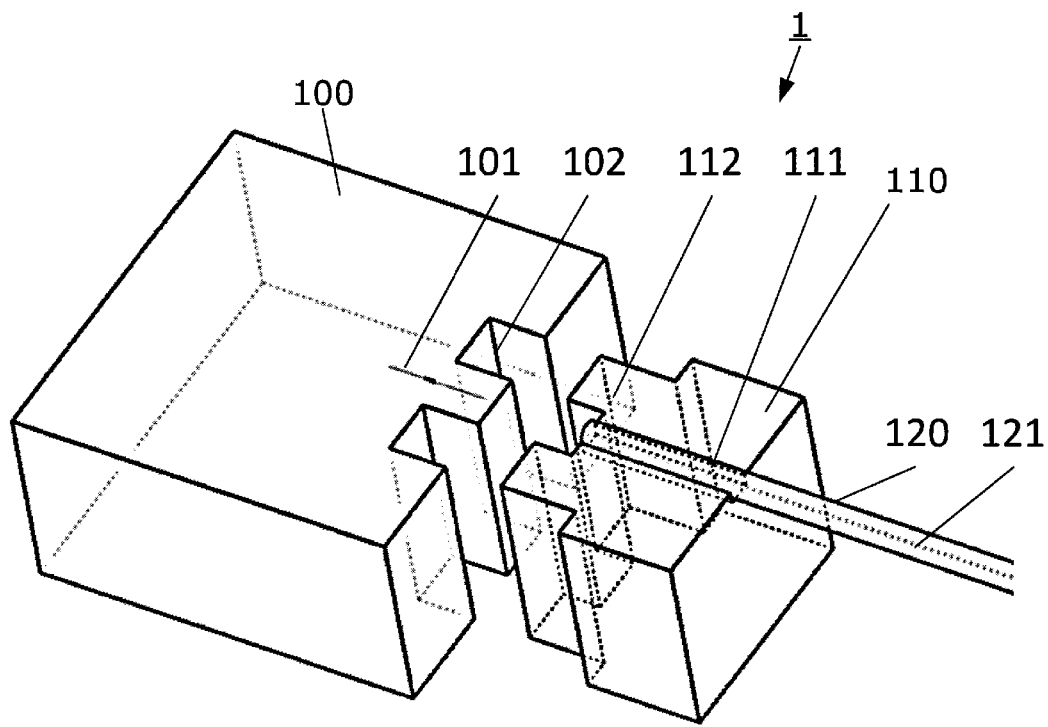
FIG. 1A is a perspective view describing a waveguide connection structure according to a first embodiment of the present invention.
Figure 1B:
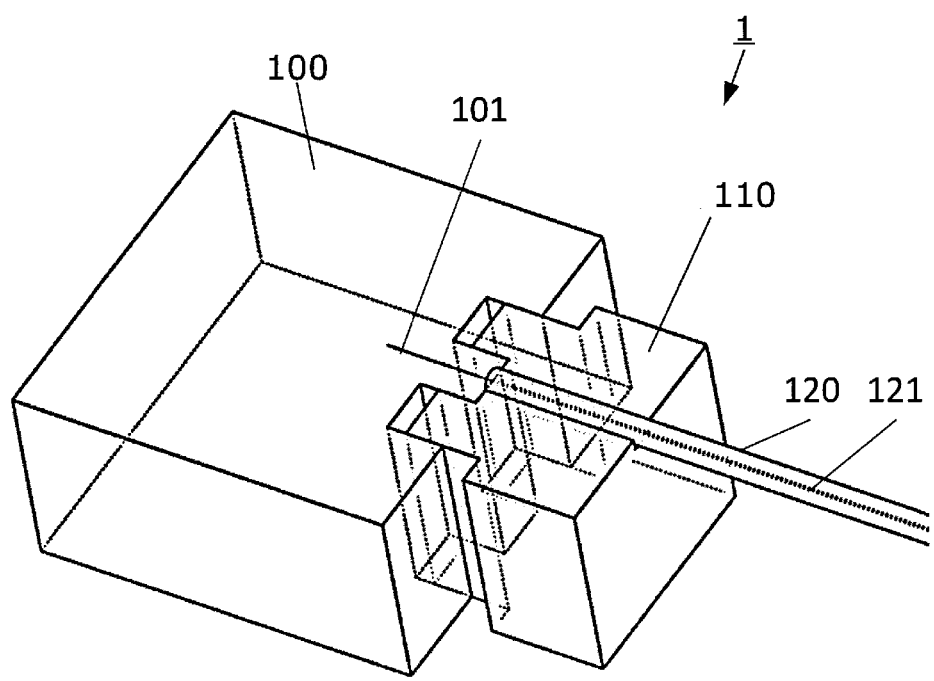
FIG. 1B is a perspective view describing the waveguide connection structure according to the first embodiment of the present invention.
Figure 2A:
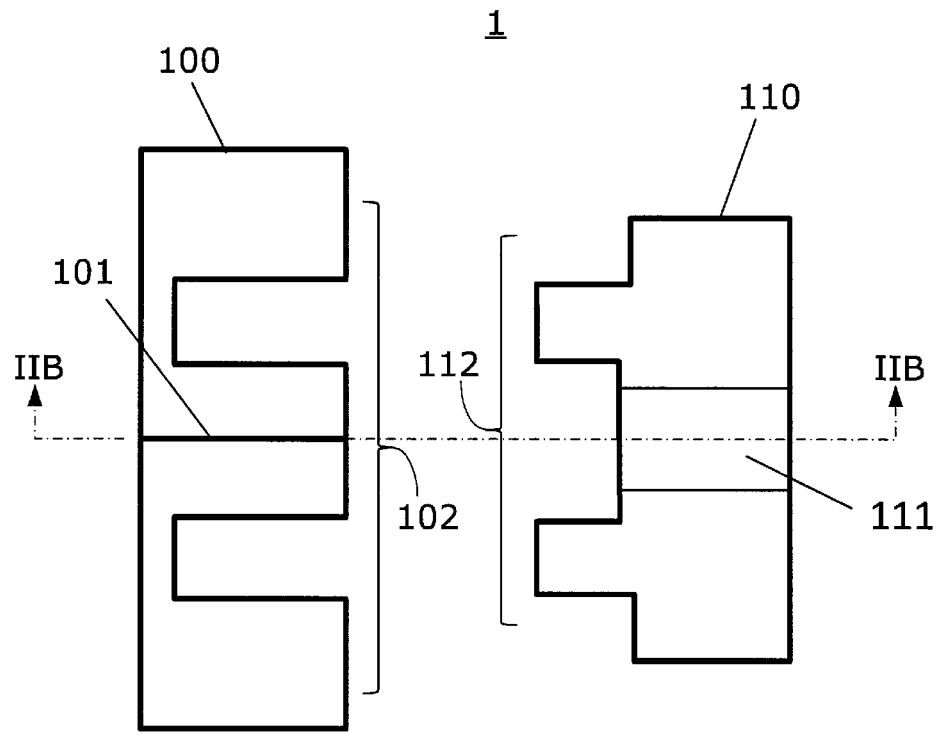
FIG. 2A is a top view describing a pre-connected state of the waveguide connection structure according to the first embodiment of the present invention.
Figure 2B:
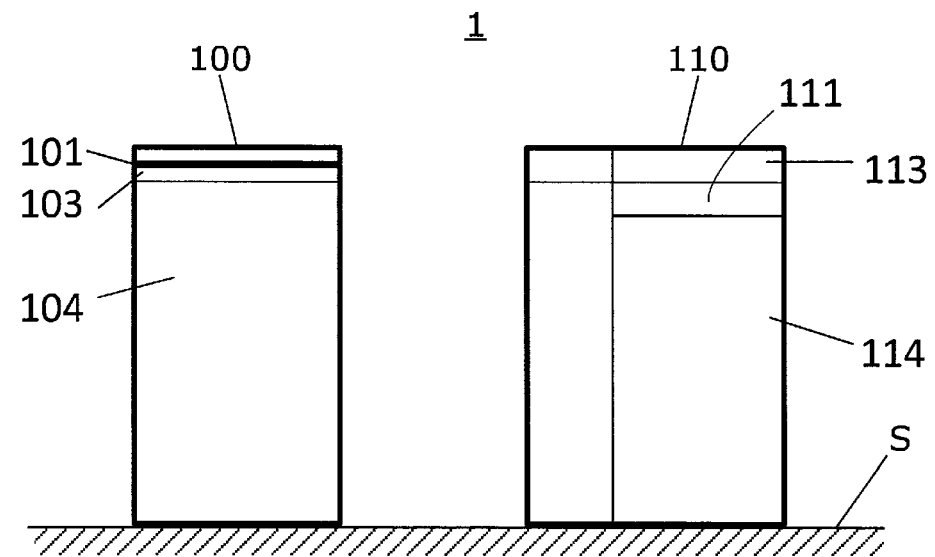
FIG. 2B is a cross-sectional view, taken along line IIB-IIB in FIG. 2A, describing a pre-connected state of the waveguide connection structure according to the first embodiment of the present invention.
Figure 2C:
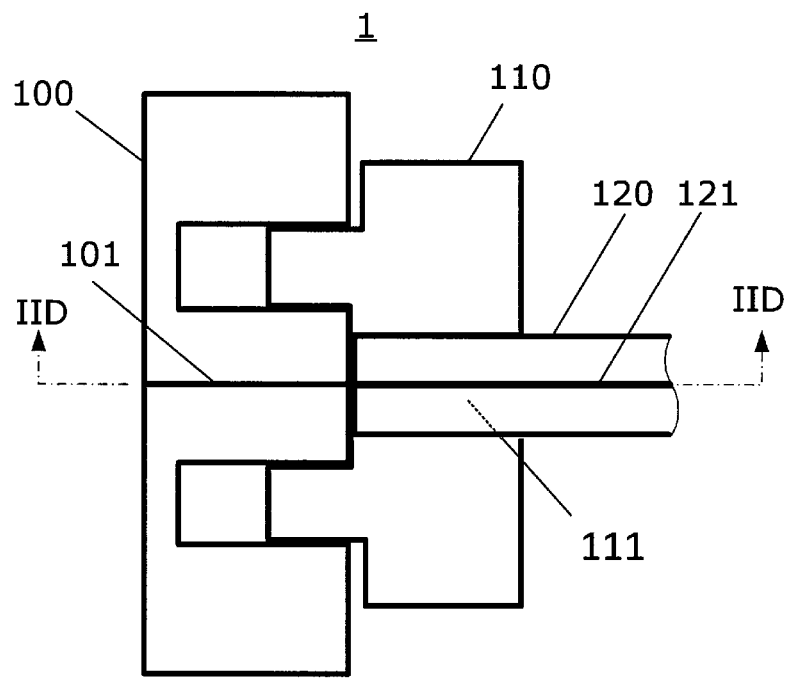
FIG. 2C is a top view describing a connected state of the waveguide connection structure according to the first embodiment of the present invention.
Figure 2D:
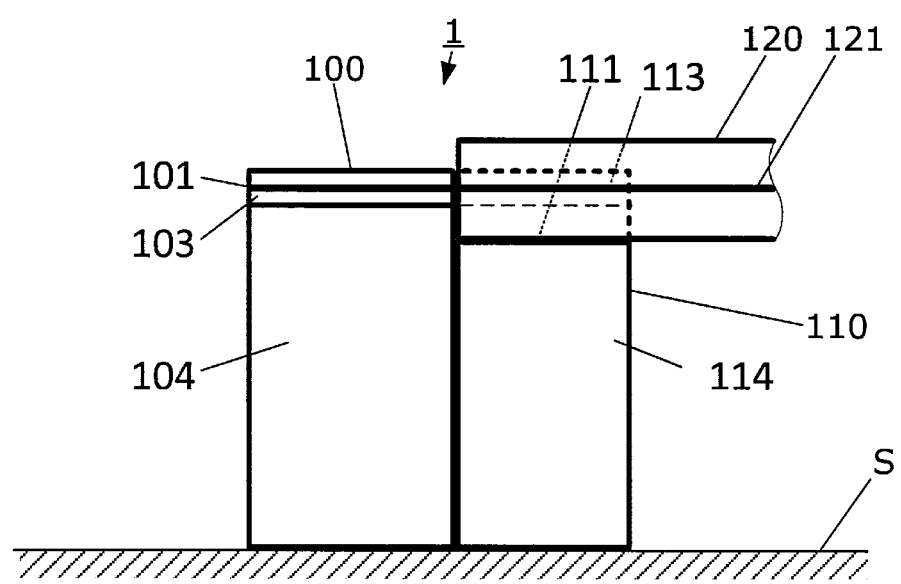
FIG. 2D is a cross-sectional view, taken along line IID-IID in FIG. 2C, describing a connected state of the waveguide connection structure according to the first embodiment of the present invention.

FIG. 1A, FIG. 1B, and FIGS. 2A to 2D show an example of a waveguide connection structure according to a first embodiment of the present invention. Of these drawings, FIG. 1A, FIG. 2A, and FIG. 2B are respectively a perspective view, a top view, and a cross-sectional view showing a pre-connected state of a waveguide connection structure 1 according to the embodiment, and FIG. 1B, FIG. 2C, and FIG. 2D are respectively a perspective view, a top view, and a cross-sectional view showing a connected state. FIG. 2B is a cross-sectional view taken along line IIB in FIG. 2A, and FIG. 2D is a cross-sectional view taken along line IID in FIG. 2C.

The waveguide connection structure 1 according to the present embodiment is composed of a waveguide chip 100 having a waveguide 101, and a connector 110 having a fiber 120, and optically connects the waveguide 101 to the fiber 120. As shown in the drawings, in the waveguide connection structure 1 according to the present embodiment, the waveguide chip 100 and the connector 110 each have concave-convex portions 102, 112 that fit into each other in a state of being adjacent to each other on the same plane.

The waveguide chip 100 has a first substrate 104 and a waveguide 101 formed on a surface of the first substrate 104. The waveguide 101 is covered by a cladding layer 103 over the first substrate 104. In the present embodiment, the first substrate 104 and the waveguide 101 are both formed of silicon (Si). In addition, the cladding layer 103 is formed of a silicon oxide film ($SiO_2$). For example, the substrate 104 is a Si substrate with a thickness of 1 mm, and a cross-sectional shape of a cross-section of the silicon waveguide 101 perpendicular to the waveguide direction is rectangular with a width of 0.1 µm and a height of 0.2 µm. In addition, the cladding layer 103 covers the waveguide 101 from above, below, left, and right as seen in a cross-sectional view with a thickness of 2 µm.

Further, at an end face of the waveguide chip 100 facing the connector 110, a concave-convex portion 102 is formed. That is to say, the first substrate 104 has a concave-convex portion 102, which is arranged along a direction orthogonal to the waveguide 101 in a plan view, and as shown in FIG. 1B and FIG. 2C, in a state of being adjacent to the connector 110 on the same plane, the concave-convex portion 102 fits into a concave-convex portion 112 formed on the connector 110.

It should be noted that in the drawings, the main components of the waveguide 101 of the waveguide chip 100 and the spot size converter at the chip end face of the waveguide 101 are omitted.

Meanwhile, the connector 110 is formed of the same materials with the same film thicknesses as the chip 100, and further, a groove 111 is formed in a substrate 114 at a portion in which the fiber is installed. Specifically, the connector 110 has a second substrate 114, and a groove in dug in a thickness direction of the second substrate 114 is formed in the upper surface of the second substrate 114. The substrate 114 has a concave-convex portion 112, which is arranged along a direction orthogonal to the groove 111 in a plan view, and as shown in FIG. 1B and FIG. 2C, in a state of being adjacent to the waveguide chip 100 on the same plane, the concave-convex portion 112 fits into the concave-convex portion 102 formed on the waveguide chip 100.

In the present embodiment, the first substrate 104 of the waveguide chip 100 and the second substrate 114 of the connector 110 are formed at the same thickness. Further, in the present embodiment, the second substrate 114, like the first substrate 104 of the waveguide chip 100, is formed of silicon (Si), and further, on the upper surface thereof, like the cladding layer 103 of the waveguide chip 100, a silicon oxide film ($SiO_2$) layer 113 is formed. Accordingly, if the cladding layer (silicon oxide layer) 103 and the silicon oxide layer 113 formed respectively on the first substrate 104 and the second substrate 114 are made to have the same thickness, then the waveguide chip 100 and the connector 110 will have the same thickness as each other.

As shown in the drawings, the groove 111 of the connector 110 is formed to extend in a direction away from the waveguide chip 100 from a position of the connector 110 corresponding to an end face of the waveguide 101 in a state where the concave-convex portion 102 of the waveguide chip 100 and the concave-convex portion 112 of the connector 110 fit into each other. At least part of an end of the fiber 120 installed in the connector 110 is accommodated in and positioned by the groove 11.

The fiber 120 has a core 121. When arranging the fiber 120 on the connector 110, the portion of the fiber 120 protruding from the connector 110 at the opposite side of the waveguide chip 100 may be covered with a resin or the like to protect the fiber 120 from mechanical or chemical irritation.

In the waveguide connection structure 1 according to the present embodiment, as shown in FIG. 2B and FIG. 2D, after the fiber 120 is installed in the connector 110, the waveguide chip 100 and the connector 110 are brought close to each other on a flat plane S to fit the concave-convex portion 102 and the concave-convex portion 112 into each other. By adjusting the depth and width of the groove in in advance according to the thickness of the fiber 120 so that the end face of the waveguide 101 of the waveguide chip 100 and the core 121 of the fiber 120 match up in this state, fitting the concave-convex portion 102 of the waveguide chip 100 and the concave-convex portion 112 of the connector 110 into each other with the waveguide chip 100 and the connector 110 on the flat plane S makes it possible to realize an optical connection between the waveguide 101 and the core 121 passively.

For example, as shown in FIG. 2C, by installing the fiber 120 on the connector 110, bringing the connector 110 close to the waveguide chip 100 on the flat plane S, and fitting the concave-convex portions 102, 112 into each other, alignment of the waveguide 101 and the core 121 is performed passively. The components may be fixed in this state by an adhesive, as necessary. For example, the outer diameter of the fiber 120 is 125 µm and the diameter of the core is 4 µm.

By forming the waveguide chip 100 and the connector 110 constituting the waveguide connection structure 1 according to the present embodiment from the same substrate and by the same process, alignment can be performed in the top view plane of FIG. 2A with a precision (0.1 µm or less) fit for microfabrication such as lithography and etching.

In addition, in the cross-sectional view plane of FIG. 2B, even substrate thicknesses normally have a thickness variation of about plus/minus 5% (for example, about plus/minus 50 µm), forming the components at adjacent portions of the same substrate makes it possible to perform alignment with a high precision (0.1 µm or less) while avoiding production variation in the substrate.

Further, while the depth of the groove 11 of the substrate 114 is, for example, 62.5 µm, corresponding to the radius of the fiber 120, this depth can be made with a precision (0.1 µm) fit for microfabrication by controlling the etching time and conditions.

A production method of the components constituting the waveguide connection structure according to the present embodiment, namely the waveguide chip 100 and the connector 110, will be described with reference to FIGS. 3A to 3E and FIG. 4.

Figure 3A:
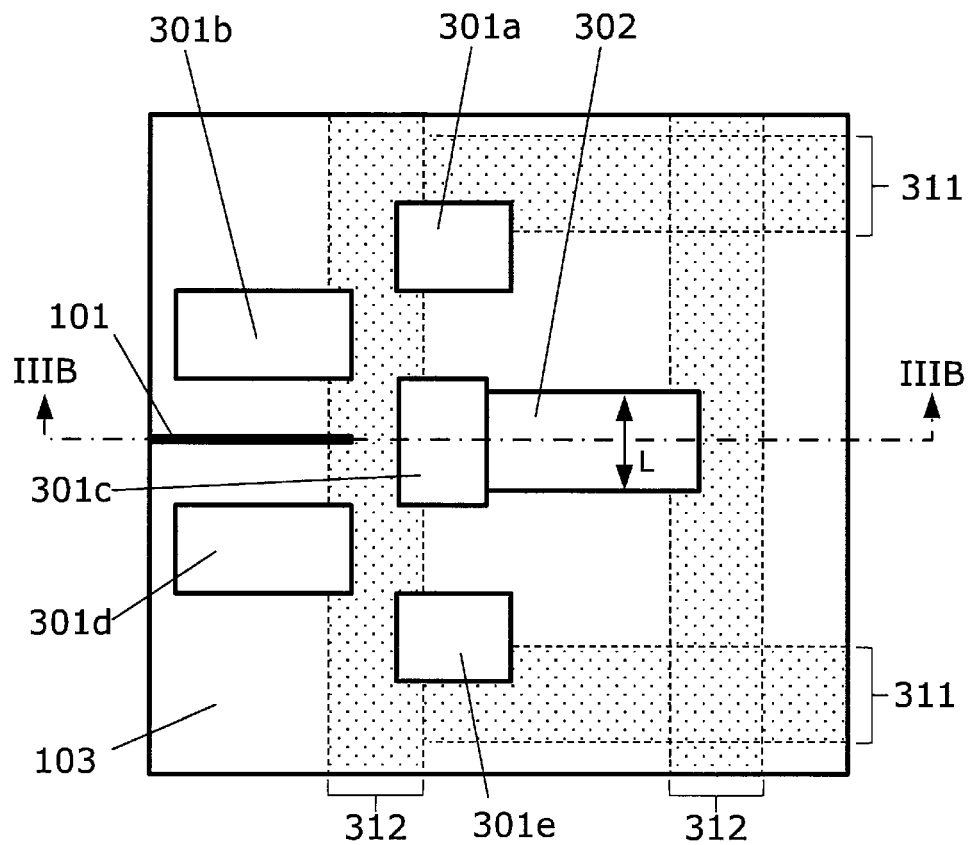
FIG. 3A is a top view showing a configuration of a wafer used in production of a waveguide connection component according to the first embodiment of the present invention.
Figure 3B:
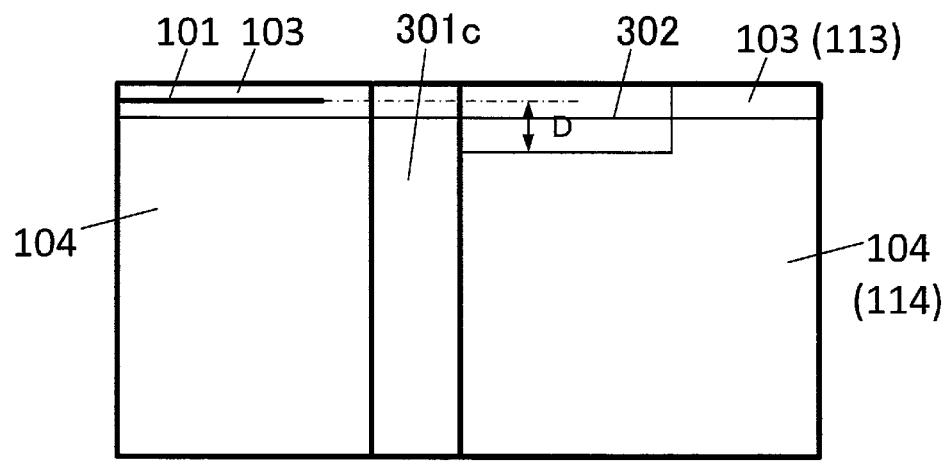
FIG. 3B is a cross-sectional view, taken along line IIIB-IIIB in FIG. 3A, showing the configuration of the wafer used in production of the waveguide connection component according to the first embodiment of the present invention.

First, a wafer, such as the one shown in FIG. 3A and FIG. 3B, having a waveguide 101, through holes 301a, 301b, 301c, 301d, and 301e, and a concave portion 302, is made.

Figure 4:
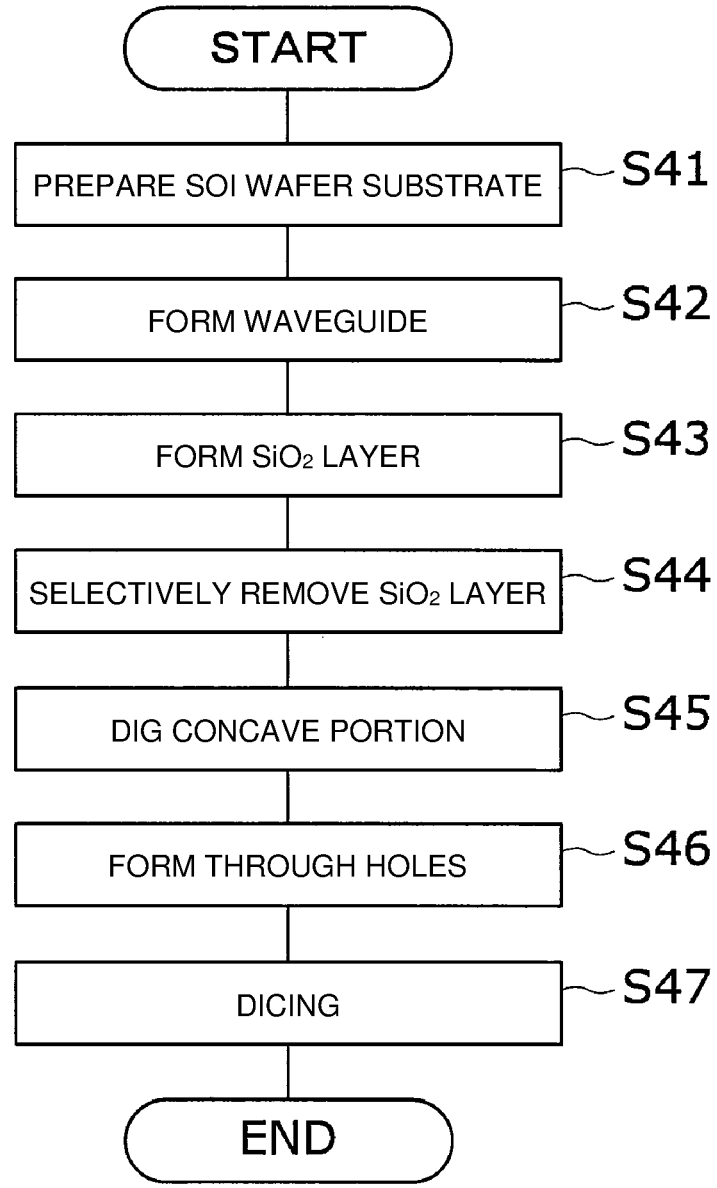
FIG. 4 is a flowchart describing a production method of the waveguide connection component according to the first embodiment of the present invention.

Specifically, first, a SOI (Silicon On Insulator) wafer substrate is prepared (FIG. 4: S41). For example, the thicknesses of the Si of the SOI layer, the SiO$_2$ of a BOX (Buried Oxide) layer, and the Si of the substrate are, respectively, 0.2 µm, 2 µm, and 1 mm.

Next, the waveguide 101 is formed by forming a resist pattern of the waveguide on the SOI layer by lithography, patterning the Si layer by dry etching using the resist pattern as a mask, and removing the resist pattern (S42).

Next, SiO$_2$ is deposited using a plasma CVD (Chemical Vapor Deposition) technique at a thickness of 2 µm to form the cladding layer 103 (S43).

Then, a resist pattern with open regions corresponding to the through holes 301a, 301b, 301c, 301d, and 301e, and the concave portion 302 shown in FIG. 3A is formed by photolithography. Using this resist pattern as a mask, the SiO$_2$ layer forming the cladding layer 103 is selectively removed by dry etching to expose an Si layer as an etch stop layer (S44). At this time, each region is positioned relative to the waveguide 101, making the resist pattern have an error of 0.01 µm or less.

When the regions of the SiO$_2$ forming the through holes 301a, 301b, 301c, 301d, and 301e, and the concave portion 302 have been selectively removed, the resist pattern is removed. Next, a resist pattern which is only open at a region corresponding to the concave portion 302 and covers all other regions (including the regions corresponding to the through holes 301a, 301b, 301c, 301d, and 301e) is formed by photolithography.

At this time, a width L of the region corresponding to the concave portion 302 (see FIG. 3A) is, for example, 125 µm, which is the outer diameter of the fiber. The resist pattern need only have a thickness of about 3 µm to be able to cover a level difference caused by the 2 µm thick cladding layer (SiO$_2$ layer), and there is no need for a very high positioning precision of the photolithography. Then, using the resist pattern and the underlying SiO$_2$ layer as a mask, the Si layer of the substrate 104 in the region corresponding to the concave portion 302 is dry etched to dig the concave portion which is to constitute the groove 11 to a desired depth (S45). The digging depth at this time may generally be set so that a distance D in the height direction between the concave portion 302 and the waveguide 101 becomes about half of the diameter of the fiber 120. In the present embodiment, the Si layer at the region corresponding to the concave portion 302 is removed to a depth of about half the outer diameter of the fiber 120 (fiber diameter 62.5 µm–BOX layer 2 µm–half of waveguide height 0.2 µm=60.4 µm).

For the dry etching, anisotropic etching by ICP-RIE (Inductively Coupled Plasma-Reactive Ion Etching) may be performed. In this case, fabrication precision in the depth direction is 0.03 µm or less, corresponding to one cycle of etching.

Then, the resist pattern is removed.

Next, a resist pattern that covers only the concave portion 302 is formed by photolithography. The resist pattern need only have a thickness of about 20 µm to be able to cover a level difference of the concave portion 302. By improving throwing power due to the viscosity of the resist, if at least the edges around the concave portion 302 can be covered, the resist pattern does not necessarily have to be formed at a film thickness corresponding to the depth of the concave portion 302. Further, there is no need for a very high positioning precision of the photolithography.

Using this resist pattern and the SiO$_2$ layer as a mask, the Si layer of the substrate 104 exposed at the bottoms of the concave portions formed in the regions other than the concave portion 302, namely the regions forming the through holes 301a, 301b, 301c, 301d, and 301e is removed by dry etching (ICP-RIE) all the way to the backside, to form the respective through holes (S46).

FIG. 3B is a cross-sectional view taken along line IIIB in FIG. 3A. The through holes formed in regions 301a, 301b, 301c, 301d, and 301e, as shown in FIG. 3B, are preferably shaped to be perpendicular (90°) relative to the surface of the substrate, so that there is no tapering (a gradient in the perpendicular direction of the substrate) when viewed in cross-section, but they may also be of a shape that expands toward the backside.

Once a wafer having the waveguide 101, the through holes 301a, 301b, 301c, 301d, 301e, and the concave portion 302 as shown in FIG. 3A and FIG. 3B has been made, the wafer is then diced and separated into a first piece which is to become the waveguide chip 100 and a second piece which is to become the connector 110 (S47).

Figure 3C:
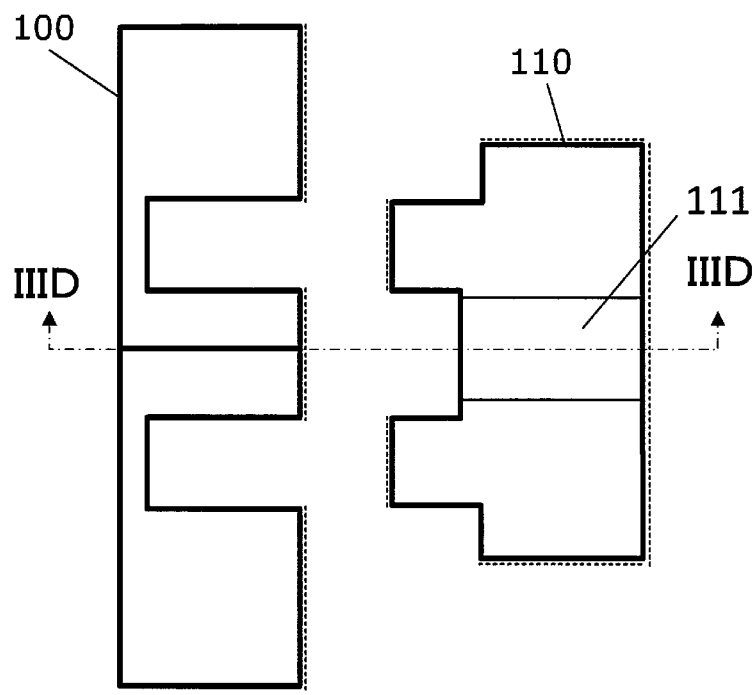
FIG. 3C is a top view showing the waveguide connection component according to the first embodiment of the present invention.
Figure 3D:
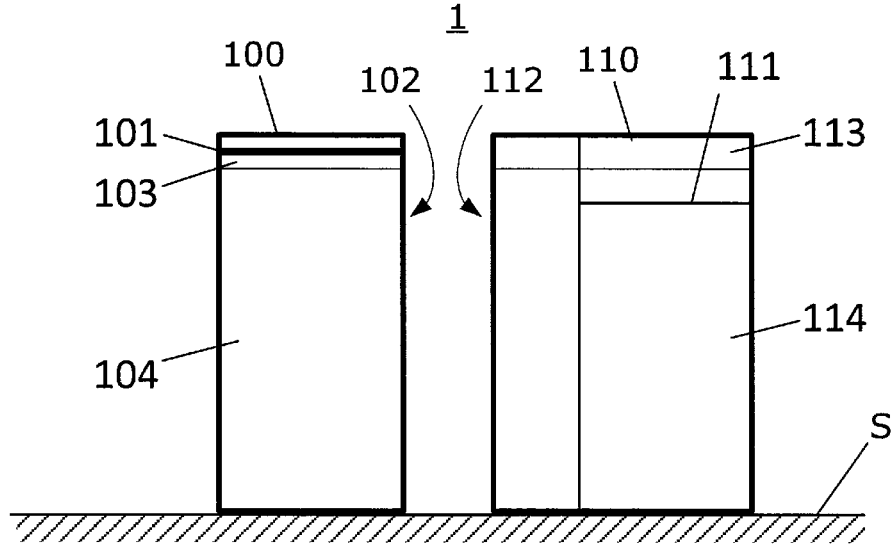
FIG. 3D is a cross-sectional view, taken along line IIID-IIID in FIG. 3C, showing the waveguide connection component according to the first embodiment of the present invention.
Figure 3E:
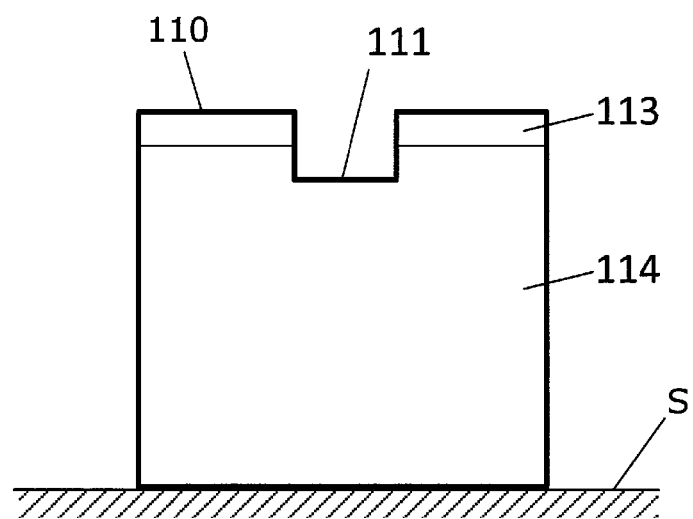
FIG. 3E is a side view of a connector of the waveguide connection component according to the first embodiment of the present invention.

Specifically, dicing is carried out using regions 311 and 312 with a width of about 70 µm shaded in FIG. 3A as scribe lines, to obtain the waveguide chip 100 and the connector 110 as shown in FIG. 3C. Since the regions 311 and 312 constituting the scribe lines shown in FIG. 3A include part of each of the through holes 301a, 301b, 301c, 301d, and 301e, the waveguide chip 100 and the connector 110 have both surfaces formed by dry etching and surfaces formed by dicing in their side surfaces. In FIG. 3C, the dotted lines represent side surfaces formed by dicing. While the surfaces formed by dicing have a low fabrication precision and are rough, the other portions, including the side surfaces of the concave-convex portions 102, 112 that fit into each other, are formed by dry etching of the wafer process, and have a high fabrication precision and are flat. In addition, by dicing through part of the concave portion 302, the groove 11 for placing the fiber 120 is formed penetrating the left and right side surfaces of the connector 110.

The above process is the wafer process for making the wafer having the waveguide 101, the through holes 301a, 301b, 301c, 301d, 301e, and the concave portion 302 as shown in FIG. 3A. This wafer process makes it possible to produce the waveguide chip 100 and the connector 110 simultaneously.

In FIG. 3A, the length of the waveguide chip 100 in the vertical direction (the up-down direction in the drawing) is longer than the vertical length of the connector 110, so the regions 311 for dicing are discontinuous straight lines which end partway through, but it goes without saying that if the lengths of the waveguide chip 100 and the connector 110 in the vertical direction have the same, the wafer may be diced in a grid-like shape.

The connector 110 may be connected to the waveguide chip 100 in the following way, for example.

First, the fiber 120 is fixed in the groove 111 of the connector 110. Since the groove 111 is microfabricated at a high precision to fit the outer diameter of the fiber 120, the fiber 120 can be passively fixed in the connector 110. An adhesive or the like may be used to fix the fiber 120.

Then, the chip 100 and the connector 110 are brought close to each other on a flat plane S into a state where the concave-convex portions 102 and 112 fit into each other as shown in FIG. 2C. Since the concave-convex portion 102 and the concave-convex portion 112 are made by the same dry etching process, they fit together with a high precision. In the height direction, the groove 111 is fabricated with a high precision, and is made from an adjacent portion of the same substrate. Accordingly, the waveguide 101 and the core 121 are passively aligned with a high precision.

In the order described above, the fiber 120 is first fixed in the connector 110, after which the connector 110 is fitted into the waveguide chip 100, and the end face of the fiber 120 is pressed against the end face of the waveguide 101, but it is also possible to use an order in which the waveguide chip 100 and the connector 110 are first fit together, after which the fiber 120 is pressed against the waveguide chip 100 and the connector 110 and fixed in place.

Further, in the above description of the present embodiment, the fiber 120 is installed in the connector 110 so that an end face of the fiber 120 is flush with the end face of the connector 110, as shown, for example, in FIG. 2C, the waveguide 101 may be connected with the fiber 120 protruding from the end face of the connector 110. By doing so, any roughness of the end surface of the waveguide 101 of the chip 100 formed by dicing is limited to the portion in contact with the fiber, which may reduce the influence of the rough surface.

Further, while the present embodiment is intended for one fiber with one core 121, it goes without saying that it may also be applied to a multicore fiber having a plurality of cores, or a fiber array in which a plurality of fibers are arranged.

In addition, the length of the fiber to be fixed to the connector may be suitably set with consideration to mechanical strength and stability, an adhesive may be used to strengthen the fixation, and a coating material may be coated onto the fiber to prevent chemical deterioration of the fiber.

As described above, according to the present embodiment, the waveguide chip 100 and the connector 110 are formed from the same substrate using the same microfabrication process, which makes it possible to obtain a waveguide connection structure capable of realizing highly precise and passive alignment.

[Second Embodiment]

Next, a second embodiment of the present invention will be described with reference to FIG. 5A and FIG. 5B.

FIG. 5A is a drawing that corresponds to FIG. 3A used in the above description of the first embodiment, and shows a configuration of a wafer used for producing a waveguide chip 500 and a connector 510 of a waveguide connection structure 5 according to the present embodiment.

Figure 5B:
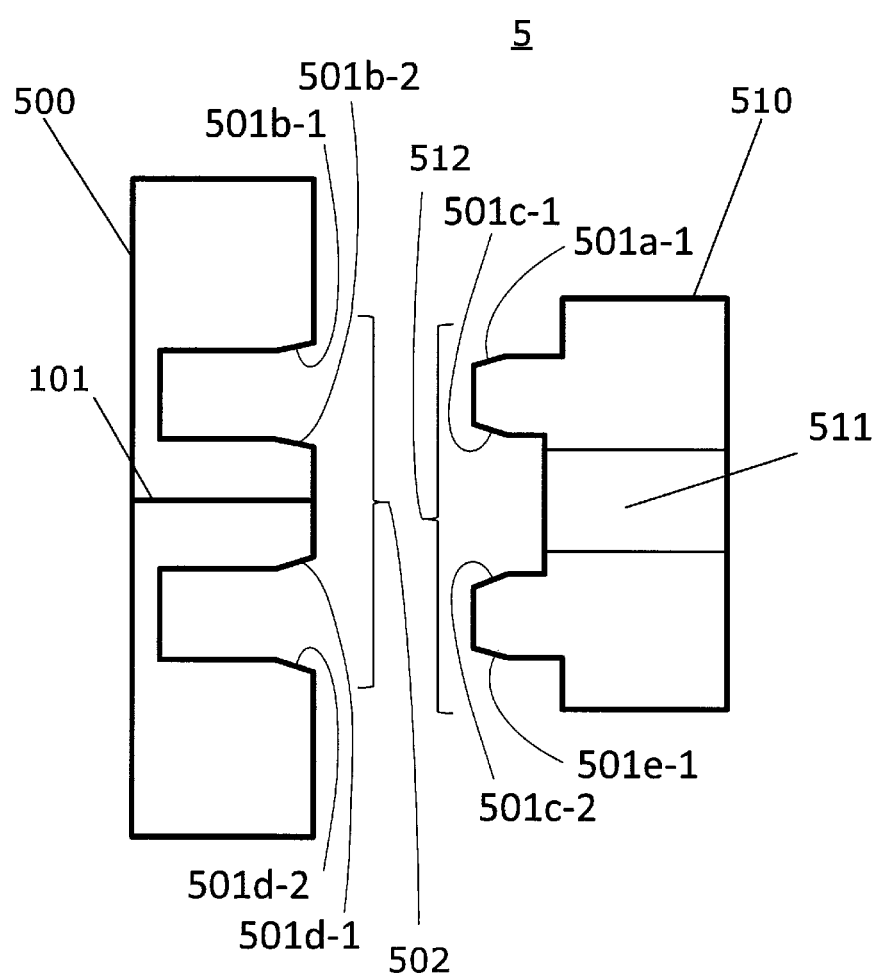
FIG. 5B is a top view showing the waveguide connection component according to the second embodiment of the present invention.

As shown in FIG. 5B, in the waveguide connection structure according to the present embodiment, a concave-convex portion 502 of the waveguide chip 500 and a concave-convex portion 512 of the connector 510 have the ends of the convex portions formed in tapered shapes.

As such, in the first embodiment, as shown in FIG. 3A, the through holes 301a, 301b, 301c, 301d, and 301e formed in the wafer are formed in a rectangular shape in a plan view, whereas in the present embodiment, as shown in FIG. 5B, when the through holes 501a, 501b, 501c, 501d, and 501e are formed, they are made to be of a shape in which angular chamfers 501a-1, 501b-1, 501b-2, 501c-1, 501c-2, 501d-1, 501d-2, and 501e-1 are added, and the wafer is processed.

Because of this, the concave-convex portion 502 and the concave-convex portion 512 will be of a chamfered shape after dicing, as shown in FIG. 5B. This allows for a smooth fit, without causing problems such as the corners of the concave-convex portions colliding and being damaged when fitting.

Third Embodiment

Figure 6A:
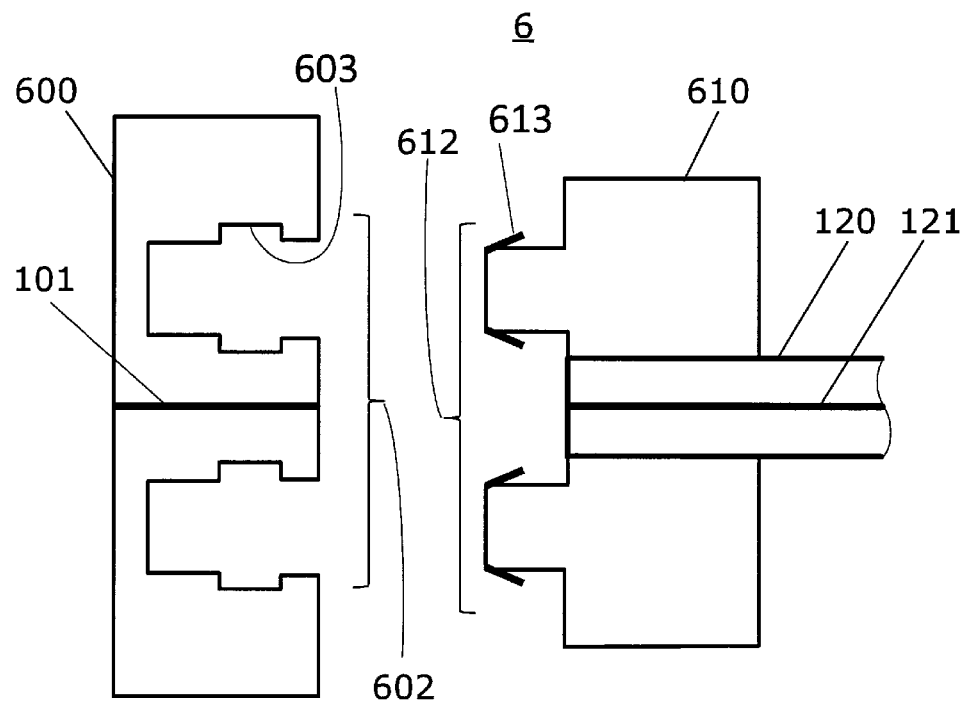
FIG. 6A is a top view showing a configuration of a substrate used in production of a waveguide connection component according to a third embodiment of the present invention.

As shown in FIG. 6A, a waveguide connection structure 6 according to a third embodiment of the present invention is of a structure in which concave portions 603 are further formed in a concave-convex portion 602 of a waveguide chip 600, and leaf springs 613 are added to a concave-convex portion 612 of a connector 610. In other words, in the waveguide connection structure 6 according to the present embodiment, there is provided a locking mechanism consisting of locking claws formed on the concave-convex portion of one of the waveguide chip 600 and the connector 610, and locking grooves formed in the other concave-convex portion. The leaf springs 613 formed from an elastic material correspond to the locking claws mentioned here, and the concave portions 603 correspond to the locking grooves.

Figure 6B:
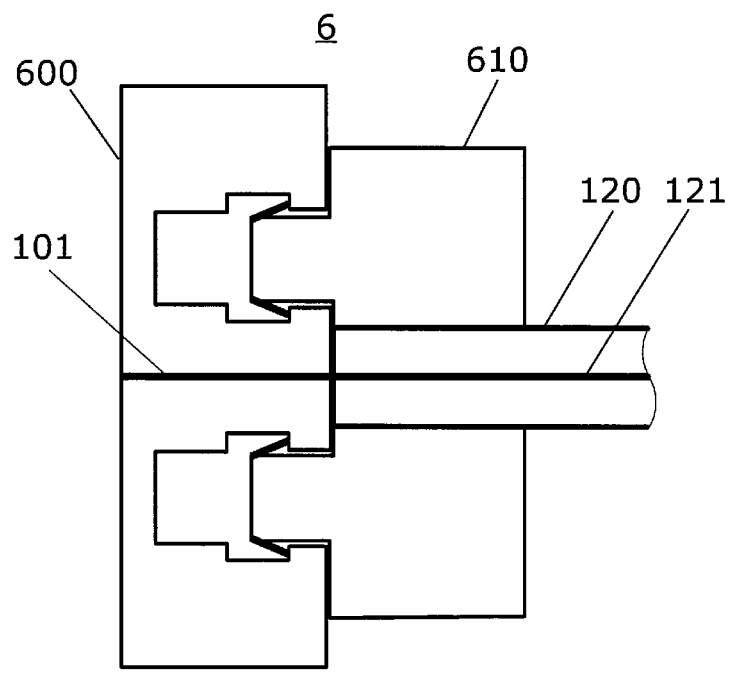
FIG. 6B is a top view showing the waveguide connection component according to the third embodiment of the present invention.

By including such a locking mechanism, when the concave-convex portion 602 of the waveguide chip 600 and the concave-convex portion 612 of the connector 610 are fitted together, the concave portions 603 and the leaf springs 613 fit together, as shown in FIG. 6B, making it possible to fix the positions of the chip 600 and the connector 610 without using an adhesive or the like.

Further, since the elasticity of the leaf spring 613 can be controlled by controlling the shape of the spring portion as seen in a top view and the thickness in the thickness direction of the substrate, the construction can be adapted to suit the application.

Fourth Embodiment

A fourth embodiment of the present invention will be described with reference to FIG. 7A to FIG. 7E.

FIG. 7A to FIG. 7E show a process of inserting a chip into a Flip Chip Ball Grid Array (FCBGA) package and surface mounting it on a printed circuit board.

Figure 7A:
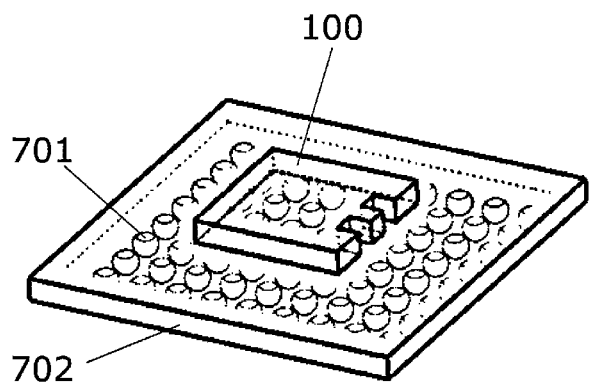
FIG. 7A is a drawing describing a process of mounting the waveguide connection structure according to the embodiments of the present invention on a printed circuit board.

First, FIG. 7A shows an example of a FCBGA substrate 702 in which bump balls 701 are formed on a substrate made of an organic resin. In a state where the wafer process is finished, the back surface of the waveguide chip 100 is polished to give the waveguide chip 100 a thickness of about 300 μm, after which it is diced into the chip and the connector. The chip 100 is electrically connected to the substrate 702 with the surface on which the waveguide 101 is formed facing down (by flipping the chip 100).

At this time, electrical connection by bumps on the chip 100 side not shown here and land patterns on the substrate 702 side is carried out, and the distance between the chip 100 and the substrate 702 is adjusted. Although not shown here, other components such as chip capacitors and the like may be similarly arranged on the substrate 702 in the space near the chip 100. Further, the electrically connected portions of the end faces of the chip 100, except for the side surface which is to be connected to the connector 110, may be protectively coated with a resin or the like.

Figure 7B:
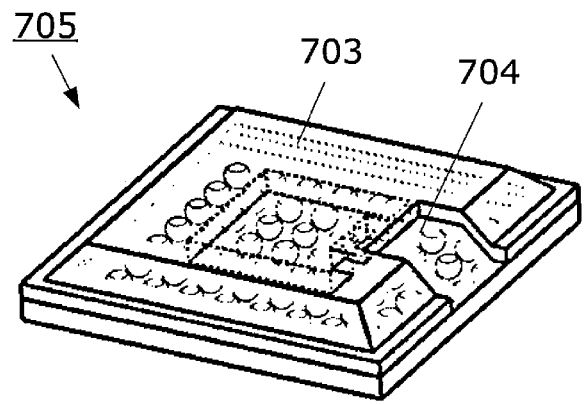
FIG. 7B is a drawing describing the process of mounting the waveguide connection structure according to the embodiments of the present invention on a printed circuit board.

Next, as shown in FIG. 7B, a lid 703 is placed, and the edges of the lid 703 are fixed to the substrate 702 with an adhesive or the like. Here, the waveguide chip 100 and the lid 703 are connected at a suitable height by a thermally conductive sheet to ensure sufficient thermal conduction. As the thermally conductive sheet, a graphite sheet with a thickness of, for example, 10 µm may be used. The lid 703 also has an opening 704. This constitutes a package 705.

Figure 7C:
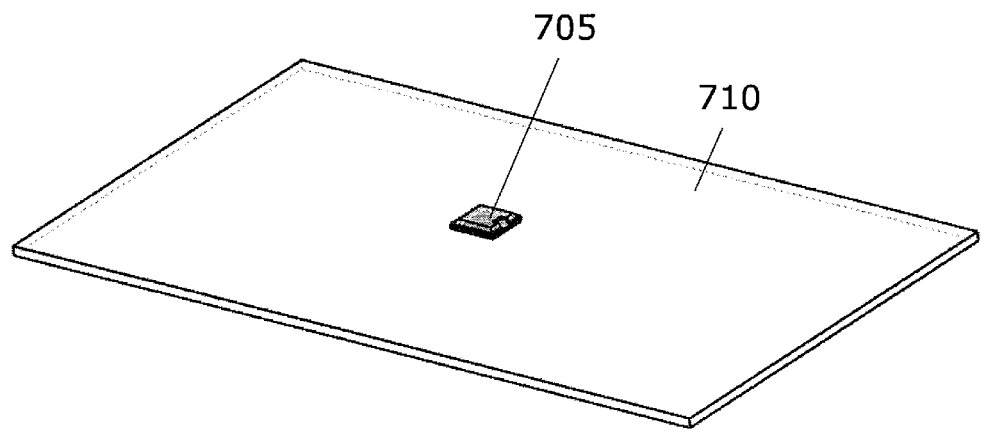
FIG. 7C is a drawing describing the process of mounting the waveguide connection structure according to the embodiments of the present invention on a printed circuit board.

Next, as shown in FIG. 7C, the package 705 is surface mounted on a printed circuit board 710 by reflow soldering. Although not shown here, a plurality of other electrical components such as LSI, chip capacitors, and electrical connectors are surface mounted on the circuit board 710 in the same process.

Figure 7D:
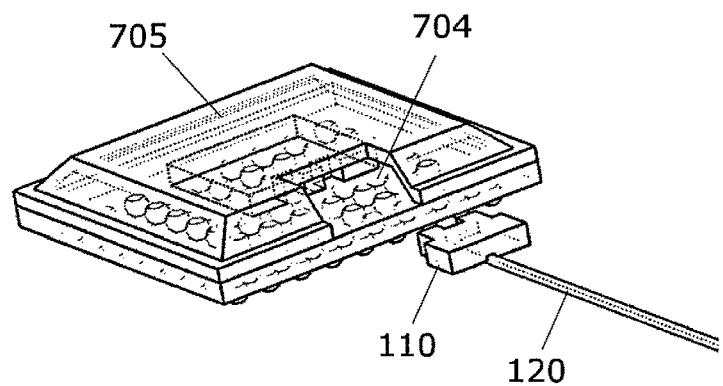
FIG. 7D is a drawing describing the process of mounting the waveguide connection structure according to the embodiments of the present invention on a printed circuit board.

Next, as shown in FIG. 7D, in a state where the package 705 is installed on the printed circuit board 710, the connector 110 is inserted through the opening 704 and fitted into the chip 100. At this time, by inserting the connector with its upper surface in contact with the inner upper surface of the lid 703 or the thermally conductive sheet, positioning is carried out automatically.

Figure 7E:
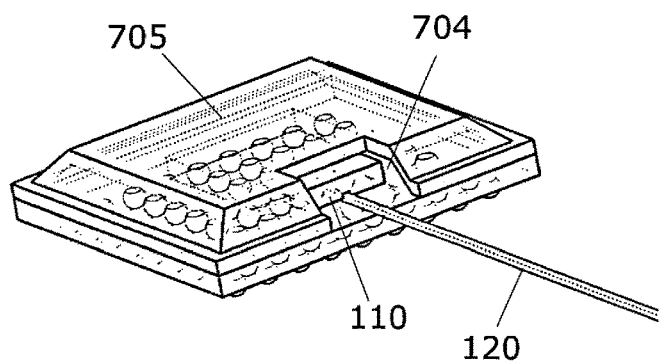
FIG. 7E is a drawing describing the process of mounting the waveguide connection structure according to the embodiments of the present invention on a printed circuit board.
Figure 8:
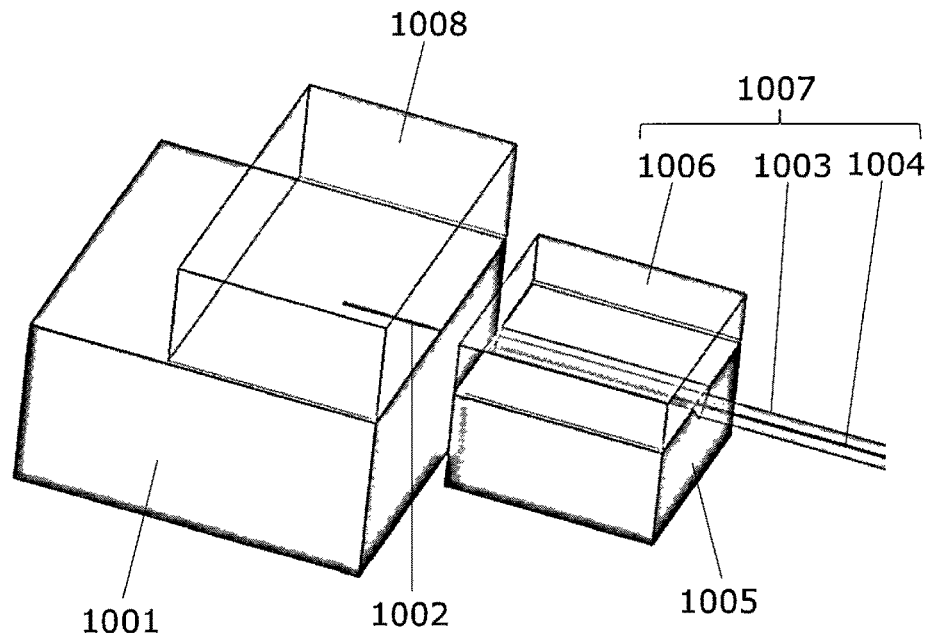
FIG. 8 is a drawing describing a conventional waveguide connection structure.

Then, as in FIG. 7E, the connector 110 is fitted into the chip inside the package 705 and is passively aligned, whereby the fiber 120 and the waveguide on the chip are passively aligned. If necessary, adhesive may be applied in advance to the end surface of the fiber 120 and the vicinity thereof to be cured by heat treatment or the like after fitting. In addition, after this the opening 704 may be protected by a resin or the like, or the space formed between the inner surface of the lid 703 and the chip 100 may be filled with resin through the opening 704.

As described above, after surface mounting the waveguide chip 100, which is an opto-electrical component, on the printed circuit board 710, passive alignment can be done by simply inserting the connector 110.

When performing a conventional active alignment, after mounting the waveguide chip on the printed circuit board, there was a need to hold the fiber and bring it close to the chip near the printed circuit board surface to perform the alignment, but in addition to the need for equipment for holding and centering the fiber in order to do so, there was a problem in that electrical components could not be arranged near the chip on the printed circuit board. In addition, when performing active alignment before mounting on the printed circuit board, managing the excess length of the fiber was bothersome, and there was a problem in that the adhesive used in the connection between the fiber and the chip and the plastic of the commercial optical connector for the other end of the fiber could not withstand the reflow temperature (220° C. or higher) and deteriorated. Further, even when using a conventional commercial optical connector, it is not suited for direct application to a printed circuit board due to its large size and thickness.

By contrast, according to the present embodiment, the waveguide chip and the connector are separated, the connector can be made as small as the chip, and passive alignment is possible. Therefore, optical components such as a chip having a waveguide can be surface mounted by the same process as electrical components, after which the connector of the same small size as the chip may simply be inserted, achieving the superior effect of allowing for optical components to be easily mounted by the same process as electrical components.

REFERENCE SIGNS LIST

1 Waveguide connection structure
100 Waveguide chip
101 Waveguide
102, 112 Concave-convex portion
110 Connector
120 Fiber
121 Core.

The invention claimed is:

1. A waveguide connection structure, comprising of
a waveguide chip comprising a waveguide and
a connector comprising a groove dug in a thickness direction,
wherein the waveguide chip comprises a first concave-convex portion and the connector comprises a second concave-convex portion,
wherein the first concave-convex portion extends continuously from a top surface of the waveguide chip to a bottom surface of the waveguide chip, the first concave-convex portion being located at the top surface of the waveguide chip and the bottom surface of the waveguide chip,
wherein the second concave-convex portion extends continuously from a top surface of the connector to a bottom surface of the connector, the second concave-convex portion being located at the top surface of the connector and the bottom surface of the connector,
wherein the groove is disposed in the top surface of the connector,
wherein the groove is configured to hold a fiber cable, and
wherein the first concave-convex portion and the second concave-convex portion fit into each such that the waveguide chip and the connector are adjacent to each other on a same plane.

2. The waveguide connection structure according to claim 1, wherein:
the waveguide chip comprises a first silicon substrate;
the connector comprises a second silicon substrate; and
the first silicon substrate and the second silicon substrate have a same thickness.

3. The waveguide connection structure according to claim 1, wherein:
a first end of a first convex portion of the first concave-convex portion has a tapered shape; and
a second end of a second convex portion of the second concave-convex portion has a tapered shape.

4. The waveguide connection structure according to claim 1, further comprising:
a locking claw on a convex portion of the first concave-convex portion, wherein the locking claw comprises a leaf spring made of an elastic material; and
a locking groove on a concave portion of the second concave-convex portion.

5. A waveguide chip comprising:
a substrate; and
a waveguide on a surface of the substrate,
wherein the substrate has a first concave-convex portion arranged along a direction orthogonal to the waveguide in a plan view,
wherein the first concave-convex portion extends continuously from a top surface of the waveguide chip to a bottom surface of the waveguide chip, the first concave-convex portion being located at the top surface of the waveguide chip and the bottom surface of the waveguide chip, wherein the first concave-convex portion is configured to fit into a second concave-convex portion of another component in a state of the substrate being adjacent to the other component on a same plane, wherein the second concave-convex portion extends continuously from a top surface of the other component to a bottom surface of the other component, the second concave-convex portion being located at the top surface of the other component and the bottom surface of the other component, and wherein the other component comprises a groove in the top surface of the other component, the groove being configured to hold a fiber cable.

6. The waveguide chip according to claim 5, wherein the substrate is a silicon substrate.

7. The waveguide chip according to claim 5, wherein a convex portion of the first concave-convex portion has a tapered shape.

8. A connector comprising:

a substrate having a groove dug in a thickness direction, wherein the substrate has a first concave-convex portion arranged in a direction orthogonal to the groove as seen in a plan view, wherein the first concave-convex portion extends continuously from a top surface of the substrate to a bottom surface of the substrate, the first concave-convex portion being located at both the top surface of the substrate and the bottom surface of the substrate, wherein the groove is disposed in the top surface of the substrate, wherein the groove is configured to hold a fiber cable, and wherein the first concave-convex portion is configured to fit into a second concave-convex portion of another component in a state of the substrate being adjacent to the other component on a same plane.

9. The connector according to claim 8, wherein the substrate is a silicon substrate.

10. The connector according to claim 8, wherein a convex portion of the first concave-convex portion has a tapered shape.

11. The connector according to claim 8, wherein the another component is a waveguide chip comprising a waveguide.

12. The connector according to claim 11, wherein the second concave-convex portion extends continuously from a top surface of the waveguide chip to a bottom surface of the waveguide chip, the second concave-convex portion being located at the top surface of the waveguide chip and the bottom surface of the waveguide chip.

* * * * *